United States Patent [19]

Williams

[11] Patent Number: 5,792,805
[45] Date of Patent: Aug. 11, 1998

[54] VULCANIZABLE RUBBER COMPOSITIONS CONTAINING SELF-CONDENSING ALKYLATED TRIAZINE RESINS HAVING HIGH IMINO AND/OR METHYLOL FUNCTIONALITY FOR IMPROVED TIRE CORD ADHESION AND REINFORCEMENT

[75] Inventor: Laurence L. Williams, Stamford, Conn.

[73] Assignee: Cytec Technology Corp., Wilmington, Del.

[21] Appl. No.: 478,581

[22] Filed: Jun. 7, 1995

[51] Int. Cl.$^6$ ..................................................... C08R 5/34
[52] U.S. Cl. .......................... 524/100; 524/102; 524/103; 525/375
[58] Field of Search .................................... 524/100, 102, 524/103; 525/375

[56] References Cited

U.S. PATENT DOCUMENTS

| | | | |
|---|---|---|---|
| 3,020,255 | 2/1962 | Magrane et al. | 260/45.3 |
| 4,038,220 | 7/1977 | Thompson | 260/3 |
| 4,230,550 | 10/1980 | Vincent | 204/159.23 |
| 4,230,740 | 10/1980 | Moyer | 427/54.1 |
| 4,339,359 | 7/1982 | Bezwada | 524/512 |
| 4,931,536 | 6/1990 | Pfohl | 528/250 |
| 5,298,539 | 3/1994 | Singh et al. | 524/92 |

FOREIGN PATENT DOCUMENTS

| | | |
|---|---|---|
| 0073174 | 3/1983 | European Pat. Off. . |
| 0366884 | 5/1990 | European Pat. Off. . |
| 57-049606 | 3/1982 | Japan . |
| 57-116628 | 7/1982 | Japan . |

OTHER PUBLICATIONS

Peterson et al, Rubber World (1984).
A. Peterson, et al., "Resorcinol Binding Systems For Steel Cord Adhesion," Rubber World (Aug. 1984).
B.F. Goodrich, "Routes to Polyurethane Modification with Hycar® Hydroxyl Terminated Reactive Liquid Polymers," HYCAR Reactive Liquid Polymers (Mar. 1981).
B. F. Goodrich "Liquid Polyurethane Elastomer from Hycar® 1300×29 (HTBN)," Hycar Liquid Polymers (Mar. 1984).

*Primary Examiner*—Edward J. Cain
*Attorney, Agent, or Firm*—Pennie & Edmonds LLP

[57] ABSTRACT

A vulcanizable rubber composition containing a high imino alkylated triazine resin additive for improved tire cord adhesion, sidewall reinforcement and/or rubber toughness without the use of resorcinol or resorcinol equivalent coreactants is described.

24 Claims, No Drawings

VULCANIZABLE RUBBER COMPOSITIONS CONTAINING SELF-CONDENSING ALKYLATED TRIAZINE RESINS HAVING HIGH IMINO AND/OR METHYLOL FUNCTIONALITY FOR IMPROVED TIRE CORD ADHESION AND REINFORCEMENT

BACKGROUND OF THE INVENTION

1. Field of the Invention

This invention relates to rubber compositions having excellent rubber toughness, tire sidewall reinforcement and/or adhesion to tire cords employing high imino and/or methylol functional self-condensing alkylated triazine resin additives in the substantial absence of resorcinol or resorcinol equivalent coreactants.

2. Related Prior Art

A widely used organic rubber additive for improving adhesion of vulcanized rubber to brass coated steel cords and polyaramide or polyester cord comprises the combination of hexamethoxymethylmelamine and resorcinol. In addition, hexamethylenetetramine is sometimes used in combination with resorcinol. Those combinations of organic compounds are quite effective for the purpose, but the use of resorcinol presents malodorous and possibly toxic hazards during rubber processing due to excessive fuming of resorcinol.

Resorcinol-free vulcanizable rubber compositions are known. For example, U.S. Pat. No. 5,298,539 discloses vulcanizable rubber compositions containing uncured rubber, a vulcanizing agent and at least one additive selected from the group consisting of derivatives of melamine, acetoguanamine, benzoguanamine, cyclohexylguanamine and glycoluril monomer and oligomers of these monomers. These derivatives are substituted on average at two or more positions on the monomer or each unit of the oligomer with vinyl terminated radicals and the composition is free of resorcinol.

Another manner of eliminating resorcinol from vulcanizable rubber compositions has relied on the use of alternative coreactants. U.S. Pat. No. 4,038,220 describes a vulcanizable rubber composition which comprises a rubber, a filler material, N-(substituted oxymethyl)melamine and at least one of α or β naphthol. This reference employs the monohydric phenols, α or β naphthol, as methylene acceptors in the resin forming reaction during vulcanization in the absence of resorcinol. The use of resorcinol-formaldehyde resin to replace resorcinol in vulcanizable rubber compositions is also known. A. Peterson, et. al., "Resorcinol Bonding Systems For Steel Cord Adhesion", Rubber World (August 1984).

Despite the various proposals made to avoid the use of resorcinol in vulcanizable rubber compositions, there is a continuing need for vulcanizable rubber compositions containing commercially available cost effective additives that improve the adhesion of vulcanized rubber to tire cords and improve rubber toughness without the use of resorcinol.

None of the above-mentioned references disclose or suggest the use of high imino and/or methylol functional self-condensing alkylated triazine resins in vulcanizable rubber compositions in the absence of resorcinol as an adhesion promoter or rubber toughener.

SUMMARY OF THE INVENTION

The present invention is directed to a vulcanizable rubber composition comprising (a) an uncured rubber, (b) a self-condensing alkylated triazine resin having high imino and/or methylol functionality represented by the formula (I)

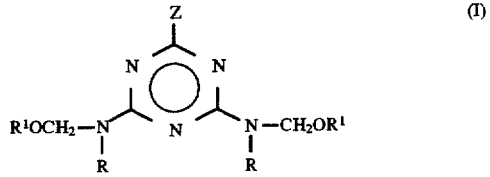

wherein Z is selected from the group consisting of $-N(R)(CH_2OR^1)$, aryl having 6 to 10 carbon atoms, alkyl having 1 to 20 carbon atoms and an acetyl group, each $R^1$ is independently selected from the group consisting of hydrogen or an alkyl group having 1 to 12 carbon atoms and each R is independently selected from the group consisting of hydrogen and $-CH_2OR^1$, wherein $R^1$ is as previously described, provided that at least one R is hydrogen or $-CH_2OH$ and at least one $R^1$ is selected from the alkyl group; and (c) a vulcanizing agent.

Z is preferably $-N(R)(CH_2OR^1)$, phenyl, methyl or cyclohexyl. Most preferably, Z is $-N(R)(CH_2OR^1)$, i.e., a melamine derivative. Preferably, at least 2, more preferably at least 3 of the R groups of triazine resin are hydrogen and/or $-CH_2OH$. It is also preferred that at least one, more preferably at least two of the $R^1$ groups are a lower alkyl group having 1 to 6 carbon atoms, most preferably methyl or butyl. Most preferably, R is hydrogen and $R^1$ is a mixture of hydrogen and methyl.

The self-condensing alkylated triazine resin employed in this invention can also be an oligomer of the triazine resin of Formula I or a mixture of the monomeric triazine and the oligomers thereof. Oligomers of this invention include dimers, trimers, tetramers and the like of the triazine compound of Formula I. Generally, such oligomers are joined by a methylene radical or the radical $-CH_2OCH_2-$ with at least one R group of the oligomer being hydrogen.

DETAILED DESCRIPTION OF THE INVENTION

The vulcanizable rubber compositions of this invention advantageously employ the self-condensing alkylated triazine resins having high imino and/or methylol functionality represented by formula I without the need of resorcinol or its equivalent. It is believed in prior art compositions, that the alkoxymethylmelamines or hydroxymethylmelamine in rubber compositions formed a network through reaction with resorcinol to improve tire cord adhesion. Without being bound to theory, it is believed in the present invention that the high reactivity of the self-condensing alkylated triazine resins having high imino and/or methylol functionality allows those resins to self-condense and form a network to improve tire cord adhesion and/or sidewall reinforcement in the vulcanized rubber obtained from the vulcanizable compositions of the present invention without the need of resorcinol as a coreactant.

Exemplary commercially available high imino alkylated triazine resins for use in the vulcanizable rubber compositions of this invention include, without limitation:

a high imino methoxymethyl melamine-formaldehyde resin having 3.8 units of combined formaldehyde and 2.8 units of methyl groups per unit of melamine ($MF_{3.8}Me_{2.8}$), 34 molar % NH, 56 molar % methylation, 10 molar % methylol and a degree of polymerization of 1.8;

a high imino mixed methoxymethyl/butoxymethyl melamine-formaldehyde resin having 3.8 units of combined formaldehyde, 1.7 units of methyl groups and 1.6 units of n-butyl groups per unit of melamine ($MF_{3.8}Me_{1.7}Bu_{1.6}$), 31 molar % NH, 34 molar % methoxy, 32 molar % n-butoxy; 3 molar % methylol and a degree of polymerization of 2.3;

a high imino methoxymethyl melamine-formaldehyde resin having 4.0 units of combined formaldehyde and 2.8 units of methyl groups per unit of melamine ($MF_{4.0}Me_{2.8}$), 30 molar % NH, 58 molar % methylation, 12 molar % methylol and a degree of polymerization of 2.3;

a high imino methoxymethyl melamine-formaldehyde resin having 4.4 units of combined formaldehyde and 3.3 units of methyl groups per unit of melamine ($MF_{4.4}Me_{3.3}$), 22 molar % NH, 66 molar % methylation, 18 molar % methylol and a degree of polymerization of 1.75; and a high imino butoxymethyl melamine-formaldehyde resin having 4.1 units of combined formaldehyde and 2.7 units of n-butyl groups per unit of melamine ($MF_{4.1}Bu_{2.7}$), 26 molar % NH, 58 molar % butylation, 16 molar % methyol and a degree of polymerization of 2.7.

Exemplary commercially available methylol functional alkylated triazine resins include, without limitation:

a methoxymethyl-methylol functional melamine resin having 4.9 units of combined formaldehyde and 2.4 units of methyl groups per unit of melamine ($MF_{4.9}Me_{2.4}$), 12 molar % NH, 48 molar % methyl, 40 molar % methylol and a degree of polymerization of 2.0; and a methoxymethyl-methylol functional melamine resin having 5.3 units of combined formaldehyde and 3.3 units of methyl groups per unit of melamine ($MF_{5.3}Me_{3.3}$), 4 molar % NH, 66 molar % methylation, 30 molar % methylol and a degree of polymerization of 2.5.

An exemplary commercially available self-condensing alkylated triazine resin having both high imino and methylol functionality is a partially methylated melamine-formaldehyde resin having 3.6 units of combined formaldehyde and 2.0 units of methyl groups per unit of melamine ($MF_{3.6}Me_{2.0}$), 38 molar % NH, 40 molar % methyl, 22 molar % methylol and a degree of polymerization of 1.8.

As noted above, the self-condensing alkylated triazine resins of this invention having high imino and/or methylol functionality can be oligomeric. Such oligomers can be represented by the formula

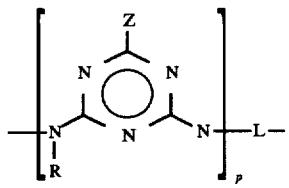

wherein p is 2 to 10, L is methylene or the radical —$CH_2OCH_2$— and Z and R are described as above. Generally, the self-condensing alkylated triazine resins of this invention are mixtures of monomers and oligomers having a degree of polymerization, i.e., the average number of triazine units per molecule, of less than 3.0. Typically, the degree of polymerization of the triazine resins of this invention is in a range from about 1.5 to 3.0.

These self-condensing alkylated triazine resins having high imino and/or methylol functionality are employed as adhesion promoting additives in the present invention by addition to vulcanizable rubber compositions in amounts in the range from about 0.2 to 10 parts by weight per 100 parts of rubber (hereinafter "phr"). However, any amount of the self-condensing alkylated triazine having high imino and/or methylol functionality may be used that provides the vulcanized rubber composition with the desired tire cord adhesion and rubber toughness properties.

The self-condensing alkylated triazines may be employed in the vulcanizable compositions of this invention in the form of liquids, solids or as dry powders on a support. Preferably, the self-condensing alkylated triazine resin having high imino and/or methylol functionality is on a support selected from the group consisting of silica, calcium silicate or the like. Generally, an amount of resin is mixed with the support in a ratio to provide a dry flowable powder, e.g., 70% by weight resin to 30% by weight support.

The self-condensing alkylated triazine resins having high imino and/or methylol functionality can be mixed with a support by heating the resin to a temperature in the range from about 50° to about 75° C. and slowly charging the heated resin to a Hobart mixer containing the support while mixing at low speed. The mixture is then agitated for an additional 5 to 10 minutes. If the resin contains solvent then the mixture may be dried in an oven at about 50° C. Silica based supports are commercially available under the tradenames MICROCEL®-E or HISIL® SC-72 from Johns Manville (Denver, Colo.) and PPG Industries (Pittsburgh, Pa.), respectively. Generally, if a support is used, the resin is present in an amount from about 55 to about 85, more preferably about 65 to about 75 percent by weight of the combined resin and support.

The principal components of the vulcanizable rubber compositions comprise rubber, which may be natural rubber or synthetic rubber, or a mixture of natural and synthetic rubbers, and a vulcanizing agent such as sulfur. Rubbers such as butadiene-styrene copolymers, polyisoprene, polybutadiene, polychloroprene, nitrile and ethylene propylene copolymers, terpolymer rubbers, acrylo and fluoro elastomers, block copolymer rubbers and the like can be used. Other conventional additives for rubber compositions may be included in rubber compositions of the present invention, such as carbon black, silica, zinc oxide, stearic acid, antioxidants, vulcanizing accelerators, and the like in preferred rubber compositions according to the present invention. A cobalt salt may also be included as a promoter for steel cord adhesion preferably used in the proportion from about 0.5 to 1.5 phr. The high imino alkylated adhesion promoting additives employed in this invention can be used in rubber compositions which also contain hydroxymethylmelamines or alkoxymethylmelamines or the like, but in a substantial absence of resorcinol or its equivalent. Equivalents of resorcinol are compounds that can be used instead of resorcinol as methylene acceptors in rubber compositions. Some resorcinol equivalents are described, for example, in U.S. Pat. No. 4,605,696.

A typical vulcanizable rubber wire skim coat formulation of the prior art and the typical ranges of the components of such formulations are set forth below.

| Typical Wire Skim Cost Formulation | |
|---|---|
| Ingredient | Ranges (phr) |
| Natural Rubber | 80.0–100.0 |
| Cis Butadiene Rubber | 0.0–20.0 |

| Typical Wire Skim Cost Formulation | |
|---|---|
| Ingredient | Ranges (phr) |
| Carbon Black | 55.0–65.0 |
| Silica | 0 . 15.0 |
| Zinc Oxide | 5.0–10.0 |
| Stearic Acid | 0.5–2.0 |
| Antidegradent (TMQ, 6PPD)[1] | 1.0–2.0 |
| Naphthenic Oil | 5.0–10.0 |
| Accelerator (DCBS, TBBS, CBS)[2] | 0.5–1.0 |
| Insoluble Sulfur | 4.0–7.0 |
| HMMM[3] | 3.0–7.0 |
| Resorcinol | 2.0–6.0 |
| Cobalt Napththenate (10.5% Co) | 1.0–2.0 |

[1]TMQ = 2,2,4-Trimethyl-1,2-dihydroquinoline, polymerized
6PPD = N-(1,3-dimethylbutyl)-N'-phenyl-p-phenylenediamine
[2]DCBS = Benzothiazyl-2-dicyclohexyl sulfenamide
TBBS = Benzothiazyl-2-t-butyl sulfenamide
CBS = Benzothiazyl-2-cyclohexyl sulfenamide
[3]HMMM = Hexamethoxymethylmelamine The hexamethoxymethylmelamine of the above-described typical prior art wire skim coat formulations can be replaced or combined with self-condensing alkylated triazine resins having high imino and/or methylol functionality and the resorcinol removed to provide the vulcanizable rubber composition of this invention.

The self-condensing alkylated triazine resins having high imino and/or methylol functionality employed in this invention can be added into rubber compositions by conventional means and methods for the addition of melamine additives in rubber compositions, such as for hydroxymethlymelamines or methoxymethylmelamines. A well known method for mixing rubber compounds is by mixing in a Banbury mixer. In one typical method, additives which are not reactive are blended first into the rubber at temperatures up to about 140° C. in the Banbury mixer. Vulcanizing agents, accelerators and adhesion promoters are added in a second mixing step at temperatures from about 90° to 100° C. Such methods of preparation, are well within the knowledge of those skilled in the art.

The Example which follows is intended as an illustration of certain preferred embodiments of the invention, and no limitation of the invention is implied.

EXAMPLE 1

A vulcanizable rubber composition for precoating tire wires which contains a high imino alkylated triazine resin and is substantially free of resorcinol is formulated by preparing the composition designated "A" in the Table below. A comparative formulation is prepared with resorcinol as illustrated below for composition "B".

| Wire Coat Formulations with and without Resorcinol | | |
|---|---|---|
| Base Compound | A (phr) Without Resorcinol | B (phr) With Resorcinol |
| Natural Rubber | 100 | 100 |
| Carbon Black | 55 | 55 |
| Zinc Oxide | 8 | 8 |
| Stearic Acid | 1.2 | 1.2 |
| TMQ[1] | 3.5 | 3.5 |
| 6PPD[2] | 0.25 | 0.25 |
| QBTS[3] | .70 | .70 |
| Insoluble Sulfur | 4.69 | 4.69 |
| HMMM[4] | — | 3.00 |
| Resorcinol (100%) | — | 2.00 |
| High Imino MF Resin[5] | 4.0 | — |
| Cobalt Naphthenate (10% Co) | 1.50 | 1.50 |

[1]2,2,4-Trimethyl-1,2-dihydroquinoline, polymerized
[2]N-(1,3-dimethylbutyl)-N'-phenyl-p-phenylenediamine
[3]Benzothiazyl-2-sulfene morpholide
[4]Hexamethoxymethylmelamine
[5]Alkylated melamine-formaldehyde resin (high imino type)
Typical Cure Conditions: 10–20 minutes at 300–320° F.

Rheological Cure Characteristics For Self-Condensing Alkylated Triazines Having High Imino And Methylol Functionality Versus A Fully Alkylated Triazine Resin The cure characteristics of (i) a high imino melamine-formaldehyde resin ($MF_{4.4}Me_{3.3}$), having 22 molar % NH, 66 molar % methylation, 12 molar % methyol and a degree of polymerization of 1.75, (ii) a partially methylated melamine-formaldehyde resin having imino and methylol functionality ($MF_{3.6}Me_{2.0}$), having 38 molar % NH, 40 molar % methylation, 22 molar % methylol and a degree of polymerization of 1.8 and (iii) a highly methylated melamine formaldehyde resin ($MF_{5.3}Me_{5.0}$) having 94.2 molar % methylation, 5.8% molar % methylol and a degree of polymerization of 1.75, were tested by generating a rheological cure profile, i.e., dynamic viscosity η* versus temperature, for each resin. The cure profiles were generated under the following conditions:
Instrument: RMS 605/TC2000 transducer
Temperature ramp=3 deg. C./min.
Angular frequency=10 rad/s
Parallel Plates: Brass, 7.9 mm dia. top; 25.0 mm dia. bottom
Gap=1.0 mm The onset temperature of cure deduced from the profile data for the partially methylated melamine-formaldehyde resin having imino and methylol functionality (ii) was 147°±5° C., for the high imino melamine-formaldehyde resin (i) was 160°±5° C. and for the highly methylated melamine formaldehyde resin (iii) was 317°±5° C.

Rheological Cure Characteristics For A Fully Alkylated Triazine Resin Mixed With Resorcinol Comparatively, the cure characteristics were measured for a mixture of a highly methylated melamine-formaldehyde resin (($MF_6Me_{5.2}$), having 97.6 molar % methylation, 2.4 molar % methylol and a degree of polymerization of 1.35) and resorcinol by generating a rheological cure profile by measuring dynamic viscosity η* at 10 radians per second, 50% maximum strain and a 3° C. per minute temperature ramp with a 50 mm lower and 25 mm upper parallel plate rheometer configuration. The rheological cure profile for the resorcinol containing resin exhibited an onset temperature of cure of 140° C.

This rheological data illustrates that a self-condensing condensing alkylated triazine resin having high imino functionality or one having imino and methylol functionality advantageously provide cure properties similar to those of a highly methylated melamine-formaldehyde resin in admixture with resorcinol.

EXAMPLE 2

A high imino melamine-formaldehyde resin ($MF_{4.4}Me_{3.3}$) having 22 molar % NH, 66 molar % methylation, 12 molar % methylol and a degree of polymerization of 1.75 in about 10% iso-butanol (561 grams) was heated to about 50°–55° C. A silica substrate (200 grams) HISIL® SC-72 (PPG Industries, Pittsburgh, Pa.) was charged to the Hobart mixer. Low speed mixing was started and the resin was slowly added to the substrate over a 5 to 10 minute time period. After charging was completed, the mixture was agitated for an additional 5 to 10 minutes followed by drying at 50° C. in a vacuum oven to provide the high imino melamine-formaldehyde resin (73.7%) on a silica support (26.3%). This supported resin is then employed in a vulclanizable rubber composition in a manner similar to Example 1, composition A.

Other variations and modifications of this invention will be obvious to those skilled in the art. This invention is not limited except to set forth in the following claims.

What is claimed is:

1. A vulcanizable rubber composition comprising:
   (a) an uncured rubber;
   (b) a dry flowable powder additive comprising a self-condensing alkylated triazine resin having high imino and/or methylol functionality on a support, wherein the self-condensing alkylated triazine resin having high imino and/or methylol functionality is selected from the group consisting of
      (i) a self-condensing alkylated triazine resin having high imino and/or methylol functionality represented by the formula (I)

(I)

(ii) an oligomer of (i), and
      (iii) a mixture of (i) and (ii),
      wherein Z is selected from the group consisting of —N(R)(CH$_2$OR$^1$), aryl having 6 to 10 carbon atoms, alkyl having 1 to 20 carbon atoms and an acetyl group, each R$^1$ is independently selected from the group consisting of hydrogen or an alkyl group having 1 to 12 carbon atoms, and each R is independently selected from the group consisting of hydrogen and —CH$_2$OR$^1$, wherein R$^1$ is as previously described, provided that at least one R is hydrogen or —CH$_2$OH and at least one R$^1$ is selected from the alkyl group; and
   (c) a vulcanizing agent,
the vulcanizable rubber composition being substantially free of methylene acceptor coreactants.

2. The vulcanizable rubber composition according to claim 1, wherein at least two R groups are hydrogen or —CH$_2$OH.

3. The vulcanizable rubber composition according to claim 2, wherein at least one R$^1$ group is a lower alkyl group having 1 to 6 carbon atoms.

4. The vulcanizable rubber composition according to claim 3, wherein the additive is selected from the group consisting of derivatives of melamine, benzoguanamine, cyclohexylguanamine, acetoguanamine and oligomers thereof.

5. The vulcanizable rubber composition according to claim 3, wherein Z is N(R)(CH$_2$OR$^1$).

6. The vulcanizable rubber composition according to claim 5, wherein the R groups are hydrogen or —CH$_2$OH.

7. The vulcanizable rubber composition according to claim 6, wherein each R$^1$ group is lower alkyl having 1 to 6 carbon atoms.

8. The vulcanizable rubber composition according to claim 1, wherein the additive is the oligomer (ii).

9. The vulcanizable rubber composition according to claim 1, wherein the additive is a mixture of triazine (i) and the oligomer (ii).

10. The vulcanizable rubber composition according to claim 1, wherein the uncured rubber is a natural rubber or synthetic rubber.

11. The vulcanizable rubber composition according to claim 10, wherein the uncured rubber is selected from the group consisting of butadiene-styrene copolymers, polyisoprene, polybutadiene, polychloroprene, nitrile and ethylene propylene copolymers, terpolymer rubbers, acrylo and fluoro elastomers, block copolymer rubbers.

12. The vulcanizable rubber composition according to claim 1, wherein the vulcanizing agent is sulfur.

13. The vulcanizable rubber composition according to claim 1, further comprising a metal compound.

14. The vulcanizable rubber composition according to claim 13, wherein the metal compound is selected from the group consisting of zinc oxide, cobalt salt and mixtures thereof.

15. The vulcanizable rubber composition according to claim 14, wherein the metal compound is cobalt salt.

16. The vulcanizable rubber composition according to claim 1, wherein the support is selected from the group consisting of silica, calcium silicate and mixtures thereof.

17. A vulcanizable rubber composition comprising:
   (a) an uncured rubber;
   (b) a dry flowable powder additive comprising a self-condensing alkylated triazine resin having high imino and/or methylol functionality on a support, wherein the self-condensing alkylated triazine resin having high imino and/or methylol functionality is selected from the group consisting of
      (i) a self-condensing alkylated triazine resin having high imino and/or methylol functionality represented by the formula (II)

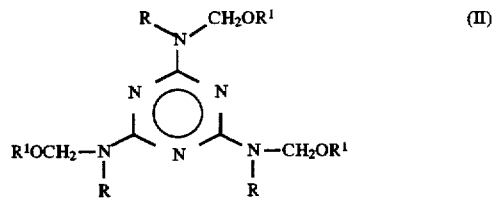

(II)

(ii) an oligomer of (i), and
      (iii) a mixture of (i) and (ii),
      wherein each R$^1$ is independently selected from an alkyl group having 1 to 6 carbon atoms and each R is independently selected from the group consisting of hydrogen and —CH$_2$OR$^2$, wherein R$^2$ is selected from hydrogen or an alkyl group having 1 to 6 carbon atoms, provided that at least one of R or R$^2$ is hydrogen; and
   (c) a vulcanizing agent,
the vulcanizable rubber composition being substantially free of methylene acceptor coreactants.

18. The vulcanizable rubber composition according to claim 17, wherein R$^1$ is methyl or butyl.

19. The vulcanizable rubber composition according to claim 18, wherein at least two R groups are hydrogen.

20. The vulcanizable rubber composition according to claim 18, wherein at least two R groups are —CH$_2$OH.

21. The vulcanizable rubber composition according to claim 17, wherein the degree of polymerization of said additive is in a range from about 1.5 to about 3.0.

22. The vulcanizable rubber composition of claim 1, comprising from 0.2 to 10 parts by weight of (b) per 100 parts by weight total.

23. The vulcanizable rubber composition of claim 17, comprising from 0.2 to 10 parts by weight of (b) per 100 parts by weight total.

24. The vulcanizable rubber composition according to claim 17, wherein the support is selected from the group consisting of silica, calcium silicate and mixtures thereof.

* * * * *